Sept. 10, 1929.  A. N. MERLE  1,727,891
PROTECTING SCREEN FOR CINEMATOGRAPHIC APPARATUS
Filed Feb. 17, 1928   2 Sheets-Sheet 2
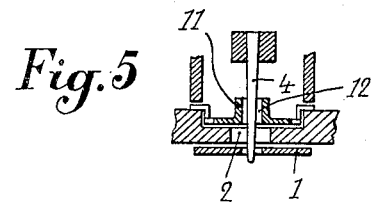
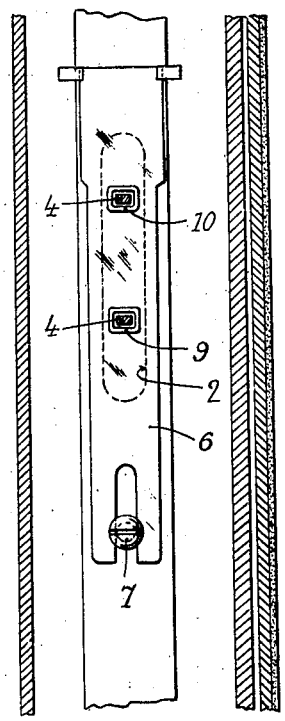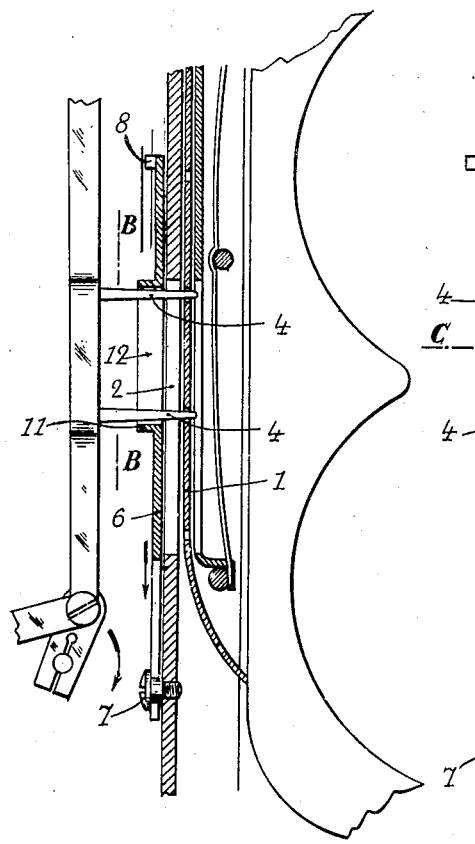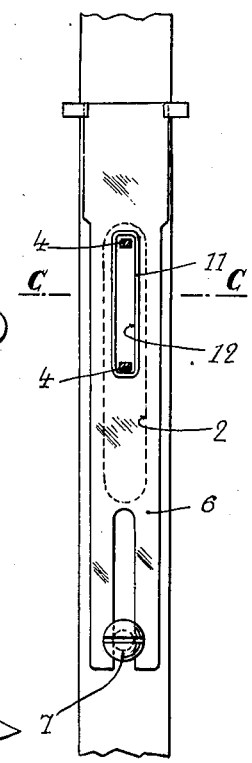
André Noël Merle
INVENTOR Patented Sept. 10, 1929.

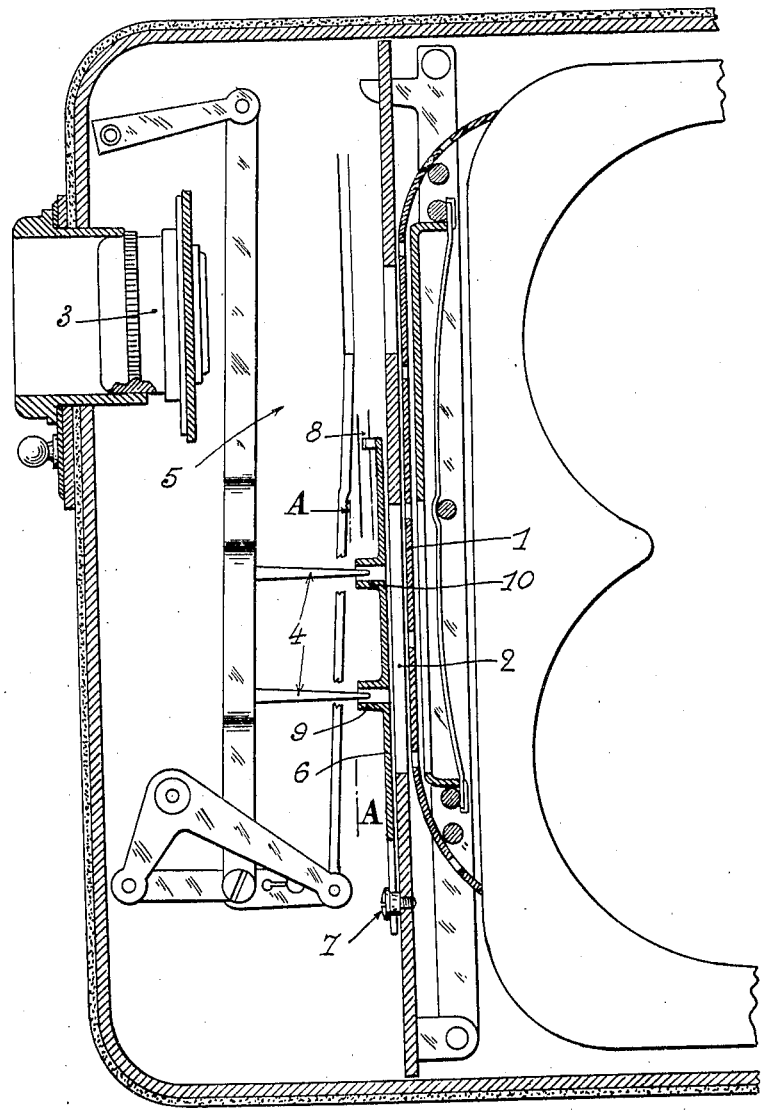

1,727,891

UNITED STATES PATENT OFFICE.

ANDRÉ NOËL MERLE, OF VINCENNES, FRANCE, ASSIGNOR TO PATHÉ CINÉMA, ANCIENS ÉTABLISSEMENTS PATHÉ FRERES, OF PARIS, FRANCE.

PROTECTING SCREEN FOR CINEMATOGRAPHIC APPARATUS.

Application filed February 17, 1928, Serial No. 255,028, and in France July 29, 1927.

In cinematographic view-taking apparatus in which the film is drawn forward by one or more claws, the part of the film adjacent the claws may be fogged by the light which enters through the lens and is diffused in the chamber containing the claw mechanism.

The present invention relates to a device by which this defect will be obviated. The said device is characterized in that it comprises a screen slidable against the projection aperture of which it closes the part used for the vertical displacement of the claws, the part used for their insertion being closed by the claws themselves.

The principal features of the invention will be specified in the following description with reference to the appended drawings which are given by way of example.

Fig. 1 is a vertical section on an axial plane passing through the claws of the front part of the view-taking apparatus which serves as an example; the section is not made through the claw-actuating arms and levers, the shutter, and the lens.

Fig. 2 is a corresponding side view, in section on the line A—A of Fig. 1.

Fig. 3 is a modification of Fig. 1.

Fig. 4 is the side view corresponding to the said modification, on the line B—B of Fig. 3.

Fig. 5 is a horizontal section on the line C—C of Fig. 4.

In the device shown in Fig. 1, the part of the film 1 which is adjacent the aperture 2 employed for the reciprocating movement of the claws 4 would be fogged by the light entering through the lens 3 and diffused in the chamber 5, if a special screen were not placed before the said aperture 2. The size of this latter depends upon the movement of the claws 4.

According to the invention, there is provided a screen 6 consisting of a plate which is vertically guided by the screw 7 and by two slots 8 or the like. The said screen, which is apertured in such manner as to provide only for the insertion of the claws in the forward direction relatively to the film, follows the motion of the claws and is drawn with them. If the back motion of the claws is excessive, it is preferable to add to the screen 6 the hollow projections 9 and 10, so that the claws will always remain in contact with the screen.

Obviously, the invention is not limited to the details of construction herein described and represented, which are given solely by way of example.

The size and shape of the said screen may be as desired. It will not be departing from the principle of the invention if the said hollow projections of the screen, instead of exactly surrounding the pointed end of each claw 4, are in certain cases reduced to a single hollow projection.

Figs. 3, 4 and 5 show this modified embodiment. In this construction the inner space 12 of this projection must be practically insufficient to allow the access of light to a degree which would fog the film adjacent the aperture 2, Fig. 3.

Having now described my invention, what I claim as new and desire to secure by Letters Patent is:

1. In a cinematographic view-taking apparatus, a partition on one side of which a perforated film is adapted to travel and provided with an elongated slot, a claw on the other side of said partition and adapted to engage said perforated film through said slot, a feeding mechanism for reciprocating said claw along said slot, a screen independent of said feeding mechanism provided with an aperture for said claw and supported by said claw opposite said slot, the length of said screen being at least equal to the sum of the length of said elongated slot and of the length of the stroke of the claw along said slot, whereby said elongated slot is constantly covered by said screen, and guiding means for said screen adapted to hold said screen near said partition.

2. In a cinematographic view-taking apparatus, a partition on one side of which a perforated film is adapted to travel and provided with an elongated slot, a plurality of claws on the other side of said partition and adapted to engage said perforated film through said slot, a feeding mechanism for reciprocating said claws along said slot, a screen independent of said feeding mechanism provided with apertures for said claws and supported by said claws opposite said slot, the length of said screen being at least equal to the sum of the length of said elongated slot and of the length of the stroke of the claws along said slot, whereby said elongated slot is constantly covered by said screen, and guiding means for said screen adapted to hold said screen near said partition.

3. In a cinematographic view-taking apparatus, a partition on one side of which a perforated film is adapted to travel and provided with an elongated slot, a claw device on the other side of said partition and adapted to engage said perforated film through said slot, a feeding mechanism for reciprocating said claw device along said slot, a screen independent of said feeding mechanism provided with apertures for said claw device and supported by said claw device opposite said slot, the length of said screen being at least equal to the sum of the length of said elongated slot and of the length of the stroke of the claw device along said slot, whereby said elongated slot is constantly covered by said screen, guiding means for said screen adapted to hold said screen near said partition and a hollow projection provided on said screen around each of said apertures, whereby said claw device remains constantly engaged with said screen, whatever the distance between the claw device and the film may be.

In testimony whereof I have signed my name to this specification.

ANDRÉ NOËL MERLE.